US012091896B2

(12) United States Patent
Eliasson et al.

(10) Patent No.: US 12,091,896 B2
(45) Date of Patent: Sep. 17, 2024

(54) METHOD OF ARRANGING AN OVERHEAD SECTIONAL DOOR

(71) Applicant: Assa Abloy Entrance Systems AB, Landskrona (SE)

(72) Inventors: Daniel Eliasson, Lund (SE); Anders Lofgren, Kavlinge (SE); Magnus Abrahamsson, Loddekopinge (SE); Anton Hansson, Kivik (SE); Johan Appell, Orebro (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 275 days.

(21) Appl. No.: 17/789,857

(22) PCT Filed: Jan. 21, 2021

(86) PCT No.: PCT/EP2021/051245
§ 371 (c)(1),
(2) Date: Jun. 29, 2022

(87) PCT Pub. No.: WO2021/148492
PCT Pub. Date: Jul. 29, 2021

(65) Prior Publication Data
US 2023/0053502 A1 Feb. 23, 2023

(30) Foreign Application Priority Data
Jan. 22, 2020 (SE) .................................... 2030016-6

(51) Int. Cl.
*E05F 15/668* (2015.01)
*E05D 15/24* (2006.01)

(52) U.S. Cl.
CPC ............ *E05D 15/24* (2013.01); *E05F 15/668* (2015.01); *E05Y 2600/46* (2013.01);
(Continued)

(58) Field of Classification Search
CPC .......... E05D 15/24; E05F 15/00; E05F 15/57; E05F 15/59; E05F 15/668; E05Y 2600/46;
(Continued)

(56) References Cited

U.S. PATENT DOCUMENTS 4,510,663 A * 4/1985 Friesz ..................... E05D 15/24 254/338
6,006,817 A 12/1999 Stone
(Continued)

FOREIGN PATENT DOCUMENTS

| | | |
|---|---|---|
| CN | 110284809 | 9/2019 |
| EP | 3181789 | 6/2017 |
| EP | 3243988 | 11/2017 |

OTHER PUBLICATIONS

International Search Report and Written Opinion in PCT/EP2020/051245, mailed Apr. 8, 2021.
Swedish Search Report in 2030016-6 mailed Jun. 8, 2020.

*Primary Examiner* — Johnnie A. Shablack
(74) *Attorney, Agent, or Firm* — Wissing Miller LLP

(57) ABSTRACT

A method of arranging an overhead sectional door (SD) in a doorframe (10; 20) that defines a door opening, the overhead sectional door (SD) comprising a plurality of door panel sections (100; 200; 300; 400; 500). The method disclosed herein involves: a) fitting a first door panel section (100) in the doorframe (10; 20), b) fitting a second door panel section (200) in the doorframe (10; 20), and c) actuating an electric motor (M) to cause the first door panel section (100) to push the section door panel section (200) a distance in an upward direction. The method further involves: d) securing the second door panel section (200) with respect to the doorframe (10; 20), e) causing said at least one electric motor (M) to move the first door panel section (100) a distance in a downward direction, thereby leaving a space (60) between the secured door panel section
(Continued)

and the first door panel section (100), f) fitting a next door panel section (300; 400; 500) in the space (60), and g) causing said at least one electric motor (M) to move the first door panel section (100) a distance in an upward direction. Further, the method involves: h) unsecuring the secured door panel section (200; 300; 400; 500) with respect to the doorframe (10; 20), causing said at least one electric motor (M) to move the first door panel section (100) a further distance in an upward direction, engaging the top edge of the next door panel section (300; 400; 500) with the bottom edge of the previously secured door panel section (200; 300; 400; 500), and securing the next door panel section (300; 400; 500) with respect to the doorframe (10; 20). The method also involves repeating steps e) to h) for each next door panel section (300; 400; 500) until at least all but a last door panel section of the overhead sectional door (SD) have been arranged.

8 Claims, 8 Drawing Sheets

(52) U.S. Cl.
CPC ..... *E05Y 2600/56* (2013.01); *E05Y 2800/742* (2013.01); *E05Y 2900/106* (2013.01)

(58) Field of Classification Search
CPC ........... E05Y 2600/56; E05Y 2800/742; E05Y 2900/106
See application file for complete search history.

(56) References Cited

U.S. PATENT DOCUMENTS

| | | | | |
|---|---|---|---|---|
| 6,640,872 | B1 * | 11/2003 | Mullet | E05D 15/242 160/218 |
| 6,648,052 | B2 * | 11/2003 | Marzari Chiesa | E06B 3/485 160/229.1 |
| 2011/0108213 | A1 | 5/2011 | James | |
| 2017/0022753 | A1 | 1/2017 | Allen | |

* cited by examiner

METHOD OF ARRANGING AN OVERHEAD SECTIONAL DOOR

This application is a 371 of PCT/EP2021/051245, filed on Jan. 21, 2021, published on Jul. 29, 2021 under publication number WO 2021/148492, which claims priority benefits from Swedish Patent Application No. 2030016-6, filed on Jan. 22, 2020, the disclosure of which is incorporated herein by reference.

TECHNICAL FIELD

The present invention relates to the technical field of motorized entrance systems having an overhead sectional door. More specifically, the present invention relates to arranging an overhead sectional door in a motorized entrance system.

BACKGROUND

Entrance systems are often motorized by automatic door operators. Such entrance systems are frequently used for providing automatic opening and closing of doors to facilitate entrance and exit to buildings, rooms and other areas. Motorized entrance systems are typically used in public and private areas, and they need to remain long-term operational without malfunctions even during heavy traffic by persons or objects passing through the entrance systems.

Many entrance systems comprise an overhead sectional door, which typically is connected to a doorframe and to a drive unit which is configured to move the door along the doorframe between an open and a closed position. The door is typically used as an industrial door or a garage door. The drive unit typically comprises at least one electric motor and sometimes a mechanical unit such as a spring to move the door. As is well known, an overhead sectional door comprises a plurality of door panel sections, sometimes referred to as “panels”, “door panels” or “door sections”.

Conventional overhead sectional doors are installed by arranging the door panel sections bottom up, where each panel is mounted on top of the previously installed panels, starting with the bottom panel and working upwards. After three or four panels, the height for placing the next panel is too high for the installer to lift the panel without requiring lifting equipment. For each panel after that, the installer requires a lift to go up and down to mount each subsequent panel and to retrieve the next one.

Installations of overhead sectional doors are therefore normally time consuming and expensive, since they include many installation steps and require special tools and lifting equipment. Additionally, the work is cumbersome and exhaustive for the installers, thus work environment issues may arise.

The present inventors have identified problems and shortcomings of the method of arranging an overhead sectional door in this respect. Accordingly, an object of the present invention is to overcome or at least mitigate one or more of these problems.

SUMMARY

An object of the present invention is, therefore, to provide a much easier and quicker procedure for arranging the door panels of an overhead sectional door, where the motorized features of the door are used not only to drive the door in normal operation, but also to simplify and speed up the process of arranging the panels for e.g. installing the door.

According to a first aspect of the invention, the above and other objects of the invention are achieved, in full or at least in part, by a method of arranging an overhead sectional door in a doorframe that defines a door opening in a motorized entrance system, the overhead sectional door comprising a plurality of door panel sections, the method involving:

a) fitting a first door panel section or a first group of door panel sections among the plurality of door panel sections in the doorframe;

b) fitting a second door panel section or a second group of door panel sections among the plurality of door panel sections in the doorframe above the first door panel section or the first group of door panel sections, such that a bottom edge of the second door panel section or a bottommost door panel section of the second group of door panel sections is supported by a top edge of the first door panel section or a topmost door panel section of the first group of door panel sections;

c) actuating at least one electric motor to cause the first door panel section or the first group of door panel sections to move a distance in an upward direction away from ground level, the first door panel section or the first group of door panel sections thereby pushing the second door panel section or the second group of door panel sections ahead of it;

d) securing the second door panel section or the bottommost door panel section of the second group of door panel sections with respect to the doorframe by fastening means;

e) actuating said at least one electric motor to cause the first door panel section or the first group of door panel sections to move a distance in a downward direction towards ground level and away from the secured door panel section, thereby leaving a space between the bottom edge of the secured door panel section and the top edge of the first door panel section or the topmost door panel section of the first group of door panel sections;

f) fitting a next door panel section or a next group of door panel sections among the plurality of door panel sections in the space between the bottom edge of the secured door panel section and the top edge of the first door panel section or the topmost door panel section of the first group of door panel section, such that a bottom edge of the next door panel section or a bottommost door panel section of the next group of door panel sections is supported by the top edge of the first door panel section or the topmost door panel section of the first group of door panel sections;

g) actuating said at least one electric motor to cause the first door panel section or the first group of door panel sections to move a distance in an upward direction away from ground level, the first door panel section or the first group of door panel sections thereby pushing the next door panel section or the next group of door panel sections ahead of it;

h) when a top edge of the next door panel section or a topmost door panel section of the next group of door panel sections reaches the bottom edge of the secured door panel section:

unsecuring the secured door panel section with respect to the doorframe by releasing the fastening means;

actuating said at least one electric motor to cause the first door panel section or the first group of door panel sections to move a further distance in an upward direction, the first door panel section or the first group of door panel sections still pushing the next door panel section or the next group of door panel sections ahead of it;

engaging the top edge of the next door panel section or the topmost door panel section of the next group of door panel sections with the bottom edge of the previously secured door panel section;

securing the next door panel section or the bottommost door panel section of the next group of door panel sections with respect to the doorframe by fastening means; and repeating steps e) to h) for each next door panel section or next group of door panel sections until at least all but a last door panel section or a last group of door panel sections of the overhead sectional door have been arranged.

The advantages of the method according to the first aspect are multiple. Firstly, no lifting equipment or special tools are required for arranging the panels on top of each other. Hence, the door panels may effectively be arranged at a consistent vertical position corresponding to the maximum height of two door panel sections mounted atop of each other. Consequently, a cheap, fast and ergonomic manual installation may be achieved which may for example avoid work environment issues for the operator staff. Secondly, the method of arranging an overhead sectional door may effectively be utilized in and for a motorized entrance system comprising a pair of drive units at respective lateral ends of each door panel section, wherein each drive unit comprises an electric motor for actuating movement of the door panel section with respect to the doorframe. The arranging method may also benefit from a conventional drive unit pulling the door from above to open or close it. The overhead sectional door may therefore be arranged by using the presented method independently of the prevailing characteristics of the current motorized entrance system being used. Thirdly, the arranging method of the present invention may vastly simplify the process of rearranging the door sections when maintenance or service is required, for e.g. changing one or more door panel sections when repair may be required. Finally, the arranging method may also be used to transport objects from the ground, such as for example roof structure panels, to a position above the sectional door which is non reachable without lifting equipment.

According to one or more embodiments, securing a door panel section with respect to the doorframe by fastening means comprises manually inserting a durable element being resistive enough to withstand a high pressure and weight corresponding to the pressure and weight of an arbitrary number of door panel sections suitable in the overhead sectional door without the durable element bulging or being damaged. The fastening means are adapted so that a door panel section are secured with respect to the doorframe in an as simple and friction-free procedure as possible, only by inserting the durable element when appropriate during the method of arranging the overhead sectional door. The advantage of having fastening means as such is that the secured door panel sections are no longer restraining the force of the motorized drive units or the mechanical spring. The fastening means enables movement of the first door panel section in a downward direction without being accompanied by the above door panel sections, thus creating a space between the first door panel section and the above door panel sections for arranging further door panel sections.

According to one or more embodiments, engaging the top edge of the next door panel section or the topmost door panel section of the next group of door panel sections to the bottom edge of the previously secured door panel section in said step h) involves use of engagement means which comprises a first hinge plate being pivotally connected to a second hinge plate, wherein the first hinge plate is mounted to a surface of the previously secured door panel section, and wherein the second hinge plate is mounted to a surface of the next door panel section or the topmost door panel section of the next group of door panel sections.

According to one or more embodiments, engaging the top edge of the next door panel section or the topmost door panel section of the next group of door panel sections to the bottom edge of the previously secured door panel section in said step h) involves use of engagement means which comprises laterally extending flange elements and receiving slots for flange elements at respective interconnecting sides of said next door panel section or said topmost door panel section of the next group of door panel sections and said previously secured door panel section, wherein said flange elements and said receiving slots for flange elements are at least partly pivotally connectable to each other by the actuation of the electric motor forcing the flange elements to be fitted into the receiving slots, thereby securing the two door panels with respect to each other.

By having flange elements and receiving slots for flange elements on the door panel sections, an automatic coupling of the door panel sections may be ensured. This may be of importance to speed up the method of combining multiple door panel sections, as well as reducing the risk of the door panels sections falling apart during arranging of the door or during operation of the door that may lead to property damages and/or personal injuries.

According to one or more embodiments, the doorframe of the overhead sectional door comprises vertical frame sections at respective lateral ends of the door opening, each vertical frame section comprising an elongated transmission member, and wherein the first door panel section comprises a pair of drive units at respective lateral ends thereof, each drive unit comprising multiple configurations of one or more electric motors and couplings which are engageable with the elongated transmission member to cause self-propulsion of the first door panel section or the first group of door panel sections with respect to the doorframe in an upward or downward direction upon actuation of the electric motors. A drive unit as the aforementioned type may be very well suited for the presented method of arranging a sectional door. By having the drive units mounted at each lateral end of the first door panel section, there will be a lesser need for frequent recalibration for the springs due to the variation of the door weight that can change for every panel that is mounted.

According to one or more embodiments, the doorframe of the overhead sectional door comprises vertical frame sections at respective lateral end of the door opening and one or more elongated transmission members, and wherein the doorframe comprises a drive unit comprising one or more electric motors coupled to a rotary output shaft adapted to transmit a movement and torque to a linkage engageable with the elongated transmission member to cause propulsion of said overhead sectional door with respect to the doorframe in an upward or downward direction upon actuation of the electric motor.

The method of arranging a sectional door may be performed by using a traditional door drive frequently used in today's overhead sectional door systems. This would of course be appropriate since it would not require any restructuring or rebuilding of the motorized entrance system. However, the arranging method of the present invention is not restricted to any specific type of door drive unit.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION OF THE EMBODIMENTS

Figure 1A:
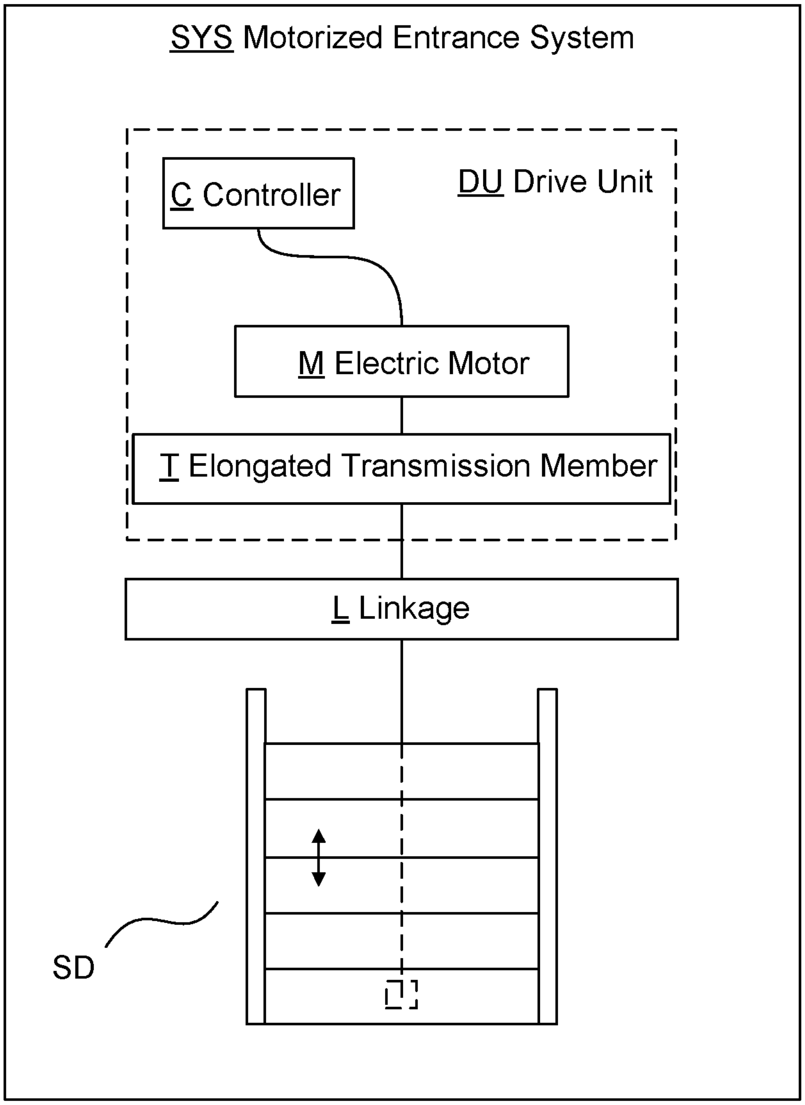
FIGS. 1A-1C are schematic block diagrams of motorized entrance systems for which the present invention may be used.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Figure 1B:
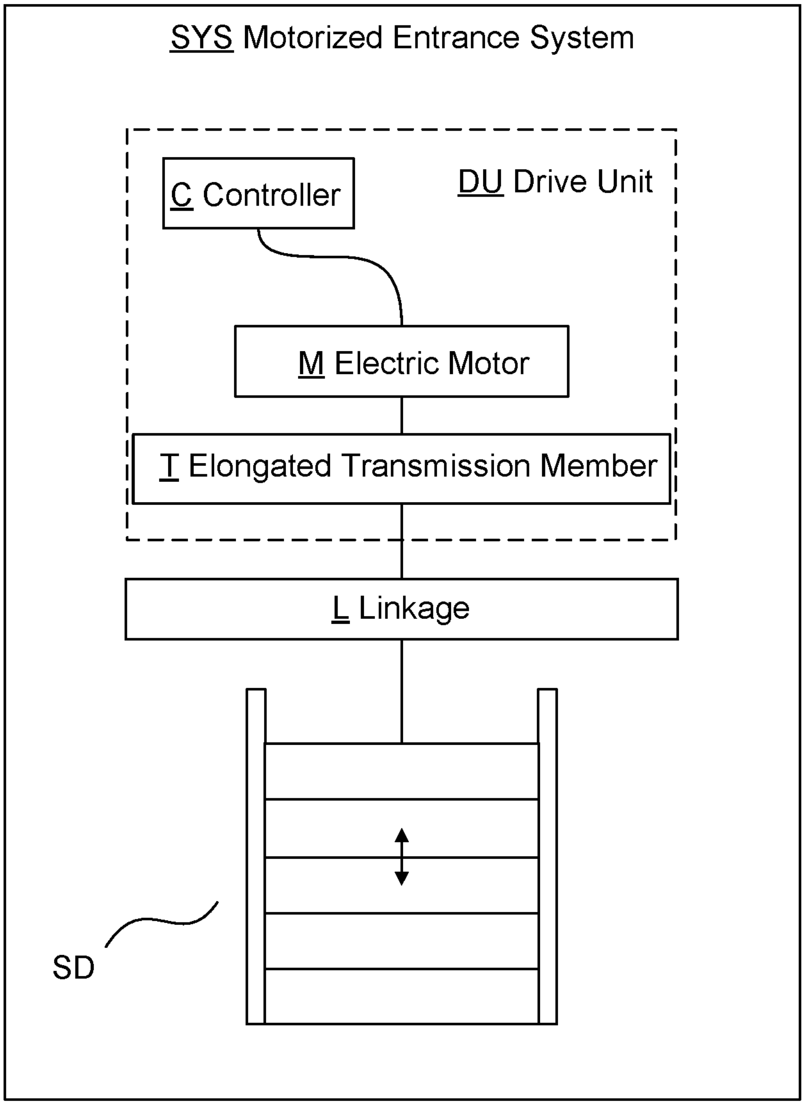
Figure 1C:
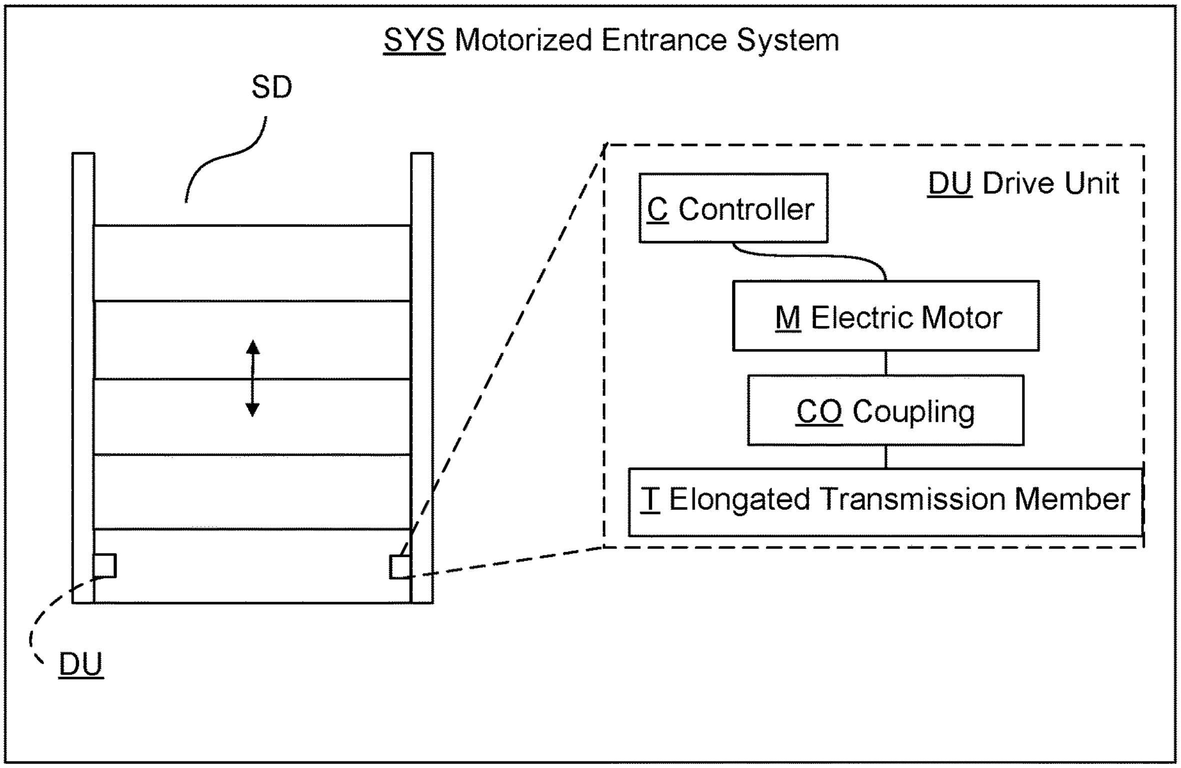

FIGS. 1A-1C are schematic block diagrams illustrating motorized entrance systems SYS in which the inventive aspects of the present invention may be applied. The motorized entrance systems SYS may comprise an overhead sectional door SD, and one or more drive units DU coupled to cause movement of the overhead sectional door SD from at least a closed position in which passage through said motorized entrance system is prevented, to an open position in which passage is admitted. In FIG. 1A, a linkage L is coupled with the bottommost door panel section of the overhead sectional door SD to take part in the door's opening and closing movement. The linkage L will pull or push the bottommost door panel section, and the other door panel sections engaged with the bottommost panel will follow. The motorized entrance system SYS may be designed for installation in a building to control access into said building from the outside of said building. FIG. 1B illustrates an embodiment where the linkage L is coupled with the uppermost door panel section for pulling or pushing the uppermost door panel section together with the other door panel sections engaged with the uppermost door panel section. In FIG. 1C, the coupling CO will cause self-propulsion of a first door panel section 100 or a first group of door panel sections with respect to the doorframe 10; 20, and push or pull additional door panel sections positioned above the first door panel section 100 or the first group of door panel sections and engaged with the doorframe 10; 20.

In FIG. 1A or 1B, the motorized entrance system SYS may comprise a drive unit DU which comprises an electric motor M configured to move the door. The drive unit DU may also comprise a mechanical unit such as a spring configured to move the door. The electric motor M is connected to one or more elongated transmission member(s) T and comprises a rotary output shaft that rotates upon activation of the electric motor M, and is connected to the linkage L. The linkage L translates the motion of the output shaft of the electric motor M into an opening or a closing motion of the sectional door SD with respect to the doorframe 10; 20. The drive unit DU further comprises a controller, which may be implemented using instructions that enable hardware functionality, for example, by using computer program instructions executable in a general-purpose or special-purpose processor that may be stored on a computer-readable storage medium (disk, memory, etc.) to be executed by such a processor. The controller C is configured to read instructions from a memory and execute these instructions to control the operation of the drive unit DU. The memory of the controller may be implemented in any known memory technology, including but not limited to ROM, RAM, SRAM, DRAM, CMOS, FLASH, DDR, SDRAM or some other memory technology. In some embodiments, the memory may be integrated with or internal to the controller C. The memory may store program instruction for execution by the controller C, as well as temporary and permanent data used by the controller C. The memory may store program instructions for execution by the controller C, as well as temporary and permanent data used by the controller C. Instructions stored in the memory of the controller C may be related to monitoring devices configured to detect an object's presence in the vicinity, thereby instructing the drive unit DU to perform an opening or closing movement of the door.

In FIG. 1C, the motorized entrance system SYS may comprise at least one drive unit DU at respective lateral ends of the first door panel section 100. The drive units comprise an electric motor M and a coupling CO which is engageable with an elongated transmission member T to cause self-propulsion of the first door panel section 100 or the first group of door panel sections with respect to the doorframe 10; 20 in an upward or downward direction upon actuation of the electric motor M. The motorized entrance system SYS embodied in FIG. 1C is not limited to having one of controller C, electric motor M, coupling CO or elongated transmission member T per drive unit DU. The drive unit DU may comprise multiple configurations of any components presented in FIG. 1C, such as for example a motorized entrance system SYS comprising one controller C for one or more electric motors M, one electric motor M and one coupling CO causing movement of the elongated transmission member T of one or more drive units DU.

FIGS. 2A-2H illustrate a preferred embodiment of the method of arranging an overhead sectional door SD in a motorized entrance system SYS with a plurality of door panel sections 100; 200; 300; 400; 500. The method of arranging the overhead sectional door SD according to FIGS. 2A-2H will now be described thoroughly and systematically. In the exemplary embodiment presented by FIGS. 2A-2H, one door panel section is arranged at a time. The method is however not restricted to arranging one door panel section at a time. For every step presented, the method may be equally suitable for arranging groups of door panel sections among a plurality of door panel sections. The number of door panel sections arranged for each step depends on a number of factors. Such factors may be, for instance, size, weight or other characteristics of the overhead sectional door SD or any mechanical components, competence of the installation or maintenance staff, the prevalent indoor or outdoor facility where the overhead sectional door SD is to be arranged at, weather conditions, and so forth.

The overhead sectional door SD illustrated in FIGS. 2A-2H comprises a doorframe or other structure 10; 20 that defines a door opening in the motorized entrance system SYS. The doorframe 10; 20 supports the overhead sectional door SD for movement between closed and open positions.

The motorized entrance system SYS further comprises at least one drive unit DU with an electric motor M for causing the first door panel section 100 to move a distance in an upward or downward direction with respect to the ground level 50.

In a preferred embodiment, the drive unit DU may be based on a drive unit similar to the drive unit presented in prior art documents such as e.g. WO2019048392A1 or WO2019048395A1. In this embodiment, the doorframe 10; 20 comprises vertical frame sections at respective lateral end of the door opening, and each vertical frame section comprises an elongated transmission member T. Further, the first door panel section 100 comprises a pair of drive units DU at respective lateral ends thereof, wherein each drive unit comprises an electric motor M and a coupling unit CO which is engageable with the elongated transmission member T to cause self-propulsion of the first door panel section 100 or the first group of door panel sections in an upward or downward direction upon actuation of the electric motor M. By using a drive unit as explained in the prior art documents, there will be a lesser need for frequent recalibration of the springs due to the variation of the door weight that can change for every panel that is mounted during arranging of the overhead sectional door SD.

In another embodiment, the drive unit DU may be based on a traditional door drive frequently used in today's overhead sectional door systems. In this embodiment, the doorframe 10; 20 comprises vertical frame sections at respective lateral ends of the door opening and one or more elongated transmission members T. The doorframe 10; 20 further comprises a drive unit comprising an electric motor M coupled to a rotary output shaft adapted to transmit a movement and torque to a linkage L engageable with the elongated transmission member T to cause propulsion of said overhead sectional door SD with respect to the doorframe 10; 20 in an upward or downward direction upon actuation of the electric motor M. Hence, the method of arranging an overhead sectional door SD may be performed such that it is not restricted to one type of door drive unit.

Figure 4A:
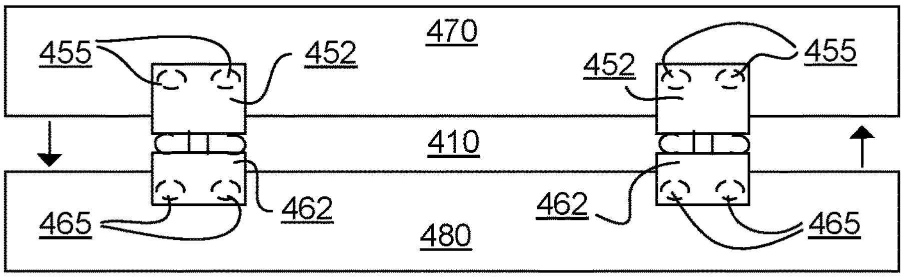
FIGS. 4A-4D are illustrations of embodiments of engagement means for securing two door panel sections with respect to each other.

The motorized entrance system further comprises means for engaging 410; 420; 430; 440 and fastening 40 door panel sections with respect to the doorframe 10; 20 and each other, respectively. Embodiments for engagement means 410; 420; 430; 440 for engaging a bottom edge of a first door panel section to a top edge of a second door panel section is showcased in FIGS. 4A-4C. FIG. 4A illustrates an embodiment where a first hinge plate 452 is pivotally or partly pivotally connected to a second hinge plate 462. The first hinge plate 452 may be mounted to a surface 470 on the first door panel section, and the second hinge 462 plate may be mounted to a surface 480 on the second door panel section.

Figure 4B:
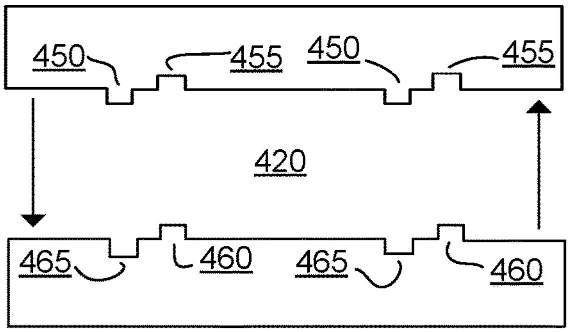

FIG. 4B shows another embodiment where the door panels have laterally extending flange elements 450; 460 and receiving slots 455; 465 for flange elements at their respective interconnecting side. The flange elements 450; 460 and receiving slots 455; 465 are adapted to being at least partly pivotally connectable to each other by the actuation of the electric motor M. The electric motor M is forcing the flange elements 450 of the first door panel section to be fitted into the receiving slots 465 for flange elements on the second door panel section, and at the same time forcing the flange elements 460 of the second door panel section to be fitted into the receiving slots 455 for flange elements on the first door panel section, thereby securing the two door panels with respect to each other.

Figure 4C:
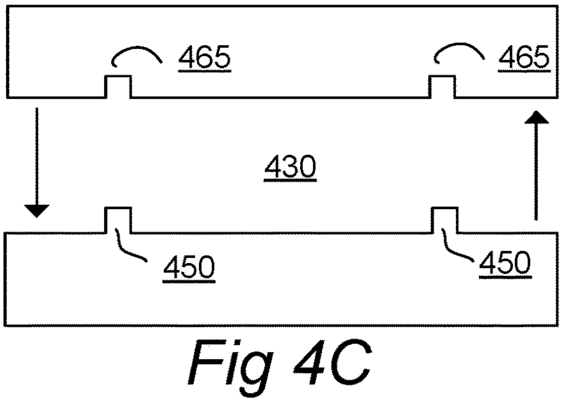
Figure 4D:
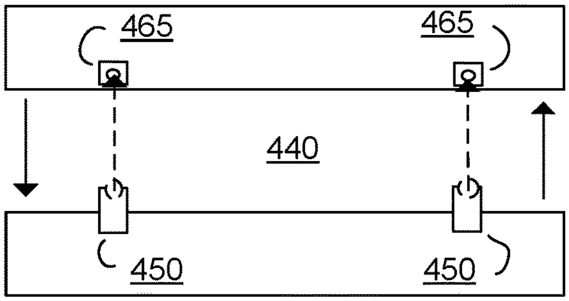

FIG. 4C illustrates a third embodiment wherein the first of the two door panel sections being connected has laterally extending flange elements 450, and wherein the second door panel section has receiving slots 465 for flange elements adapted to be fitted by the flange elements 450 of the first door panel section, thereby securing the two door panels with respect to each other upon actuation of the electric motor M, similarly to the embodiment described in FIG. 4B. FIG. 4D shows a fourth embodiment where one or more structures, such as hinges, have been mounted to the two door panel sections adapted to be fitted with respect to each other. In FIG. 4D, receiving slots 465, such as lower hinge base plates, have been mounted to the first door panel section, and flange elements 450, such as upper hinge base plates, have been mounted to the second door panel section. Engagement means 430 may include fitting flange elements 450 to the receiving slots 465 automatically. The flange elements 450 and the receiving slots 465 may also be attached manually by e.g. screwing or fitting for example one or more screws, bolts, pins, mandrels or knobs in already attached flange elements 450 and receiving slots 465 on the respective door panel section, thus effectively fitting the two door panel sections together. The flange elements 450; 460 of FIGS. 4B-4D may for example be, but not limited to being, one or more screws, screw-nuts, bolts, mandrels or any combination thereof. The receiving slots 455; 465 for flange elements are adapted to be fitted by the corresponding flange element 450; 460. The engagement means 410; 420; 430; 440 may be also be based on magnetic forces, electromagnetic forces, or any combination thereof.

The fastening means 40 may be applied or released by manually inserting a durable element being resistive enough to withstand a high pressure and weight corresponding to the pressure and weight of an arbitrary number of door panel sections suitable in the overhead sectional door SD without the durable element bulging or being damaged. The durable element may for example be, but not limited to being, one or more screws, screw-nuts, bolts, mandrels, rods, blocks or clamps. The door panel sections may comprise one or more receiving slots for the durable element adapted to be fitted by the durable element being inserted.

Figure 2A:
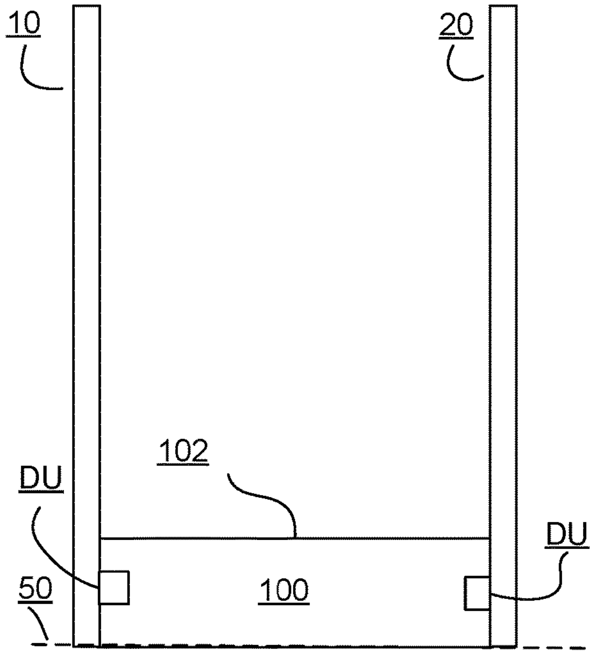
FIGS. 2A-2H is an illustration of the method of arranging an overhead sectional door with a plurality of door panel sections.
Figure 2B:
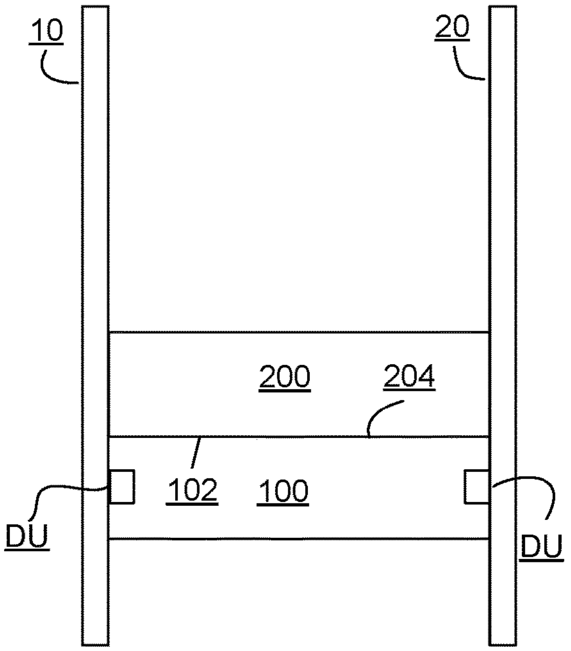
Figure 2C:
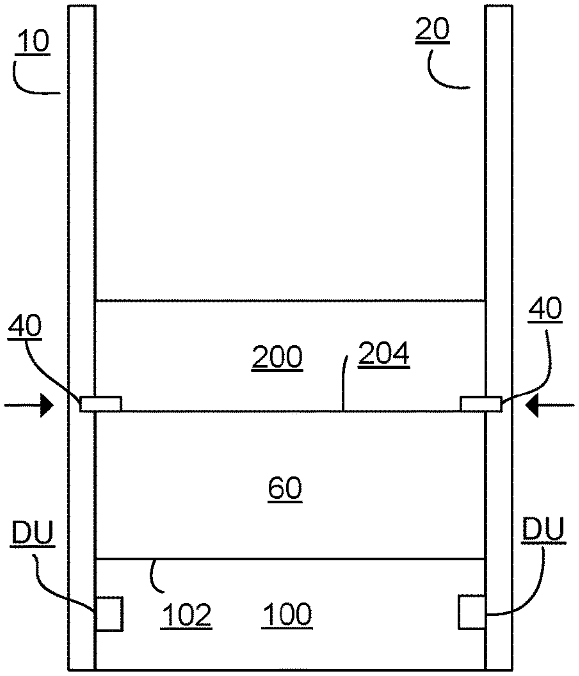

Starting from FIG. 2A, the overhead sectional door SD has been fitted with a first door panel section 100 in the doorframe 10; 20. The first door panel section 100 comprises at least one electric motor M for driving the door in an upward or downward direction upon actuation thereof. The first door panel section 100 may also be a first group of door panel sections comprising two or more door panel sections. In FIG. 2B, a second door panel section 200 has been fitted in the doorframe 10; 20 above the first door panel section 100, such that a bottom edge 204 of the second door panel section 200 is supported by a top edge 102 of the first door panel section 100. The second door panel section 200 may also be a second group of door panel sections comprising two or more door panel sections. If, for instance, the second group of door panel sections comprises two door panel sections, the bottom edge of a bottommost door panel section will be supported by the top edge 102 of the first door panel section. Similarly, if a first group of door panel sections has been arranged instead of a first door panel section 100, the top edge of a topmost door panel section of the first group is supporting the second door panel section 200 or the second group of door panel sections. In FIG. 2B, the at least one electric motor(s) M has been actuated which has caused the first door panel section 100 to move a distance in an upward direction, away from ground level 50, thereby having pushed the second door panel section 200 ahead of it. FIG. 2C comprises two steps:

Securing the second door panel 200 with respect to the doorframe 10; 20 by fastening means 40; and Actuating said at least one electric motor M to cause the first door panel section 100 to move a distance in a downward direction, towards ground level 50, and away from the secured door panel section, thereby leaving a space 60 between the bottom edge of the secured door panel section and the top edge 102 of the first door panel section 100.

If a second group of door panel sections comprising two or more door panel sections has been arranged, a bottom-most door panel section of the second group of door panel sections is instead secured with respect to the doorframe 10; 20 by fastening means 40.

Figure 2D:
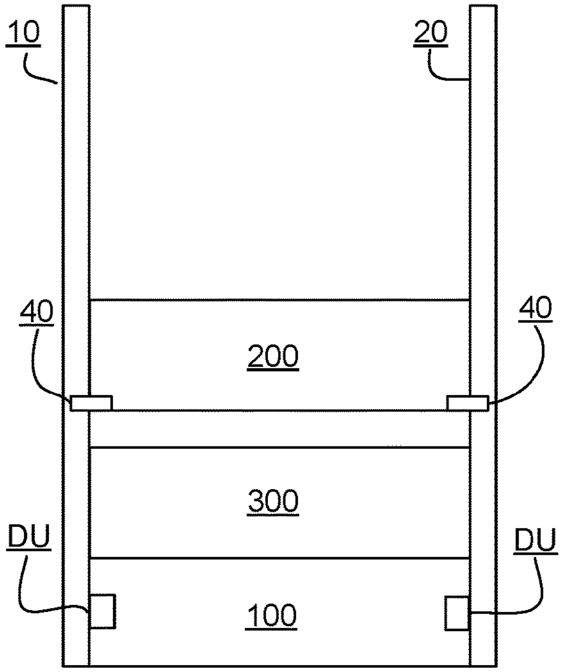

The overhead sectional door SD is now prepared for adding a next door panel section 300, as seen in FIG. 2D. The second door panel section 200 is still secured by the fastening means 40, and the first door panel is still positioned adjacent to ground level 50. A next door panel section 300 is now fitted in the space 60 between the bottom edge of the secured door panel section and the top edge 102 of the first door panel section 100, such that a bottom edge of the next door panel section 300 is supported by the top edge 102 of the first door panel section 100. The next door panel section may also be a next group of door panel sections comprising two or more next door panels.

Figure 2E:
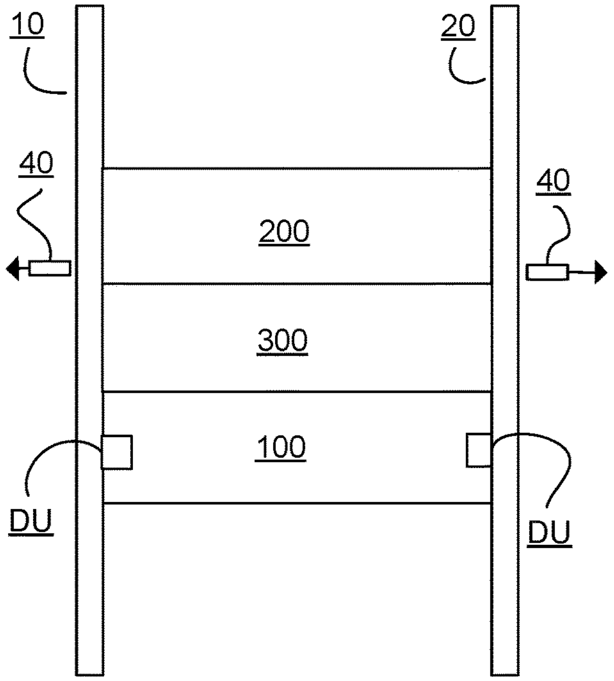

Following FIG. 2E, the method comprises two further steps:

Actuating said at least one electric motor M to cause the first door panel section 100 to move a distance in an upward direction, away from ground level 50, the first door panel section 100 thereby pushing the next door panel section 300 ahead of it; and When a top edge of the next door panel section 300 reaches the bottom edge of the secured door panel section: unsecuring the secured door panel section with respect to the doorframe 10; 20 by releasing the fastening means 40.

As can be seen in FIG. 2E, the secured door panel section being unsecured by releasing the fastening means 40 is referring to the second door panel section 200. If a second group of door panel sections has been arranged, a bottom-most door section of the second group of door panel sections is being referred to.

Figure 2F:
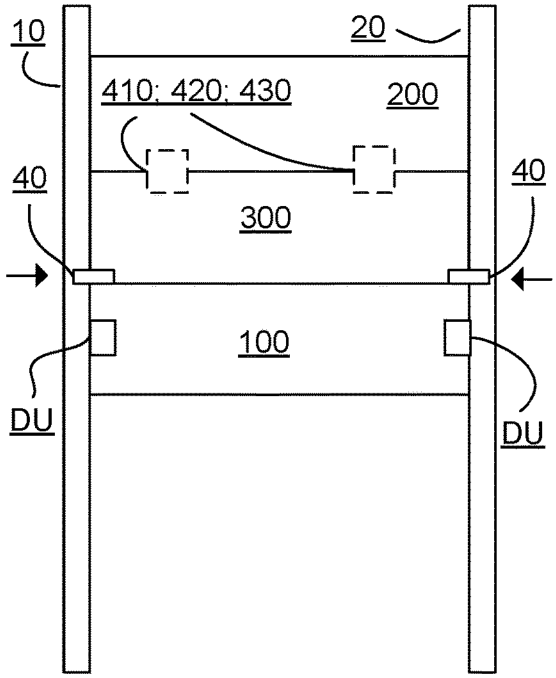

The door panel sections are now unsecured with respect to the doorframe 10; 20 by releasing the fastening means 40, and are being lifted by the motor force of the electric motor M acting on the first door panel section 100 or the first group of door panel sections. In FIG. 2F, the actuation of said at least one electric motor M has caused the first door panel section 100 or the first group of door panel sections to move a further distance in an upward direction, and having pushed the next door panel section 300 or the next group of door panel sections ahead of it. Additionally, the force from the electric motor M has caused the engaging means 410; 420; 430 of the bottom edge 204 of the second door panel 200 and the top edge of the next door panel section 300 to engage the two door panel sections 200; 300 with respect to each other. Alternatively, a first hinge plate 452 has been pivotally connected to a second hinge plate 462 and mounted to the two door panel sections 200; 300 for causing engagement of the door panel sections 200; 300 with respect to each other. Moreover, the next door panel section 200 has been secured with respect to the doorframe 10; 20 by fastening means 40.

Figure 2G:
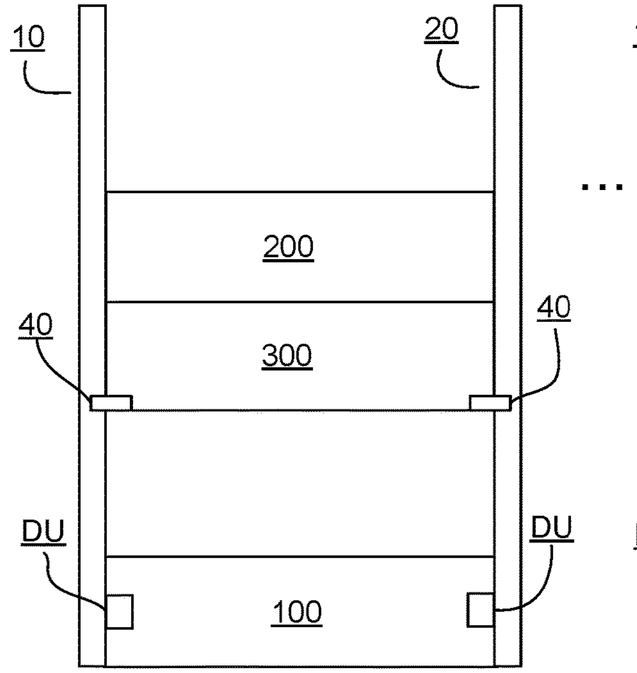

FIG. 2G shows a similar situation as FIG. 2C, with the exception that one more door panel section (the next door panel section 300) has been fitted to the doorframe 10; 20 and has been engaged with the second door panel 200. As has been repeatedly explained in the embodiment illustrated by FIGS. 2A-2H, the next door panel section 300 may be a next group of door panel sections comprising two or more door panel sections. From this point, the method of arranging further door panel sections 400, 500 is performed in a similar manner as was the case with the next door panel 300. For every next door panel section or next group of door panel sections, the secured door panel section is no longer referring to the second door panel section or the second group of door panel sections (as was explained in FIG. 2E). Since the door frame will continuously be fitted by next door panel sections, the secured door panel section will instead refer to the previously secured door panel section. The previously secured door panel section will hence the most recently arranged next door panel section, or the bottommost door panel section of the most recently arranged next group of door panel sections.

Figure 2H:
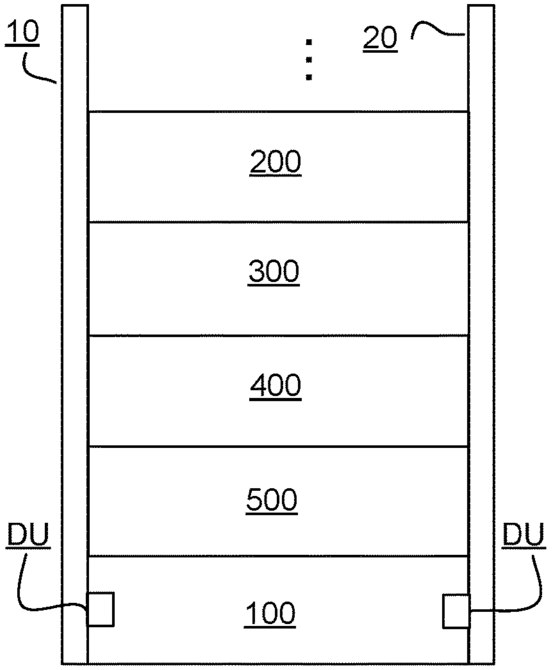

FIG. 2H illustrates an embodiment where five door panels in total 100; 200; 300; 400; 500 have been arranged to the doorframe 10; 20, and where the last door panel section 500 has been unsecured with respect to the doorframe 10; 20 by releasing the fastening means 40, thus forming an overhead sectional door SD.

As has been touched upon before, it is of general understanding that the method steps as described in FIGS. 2A-2H may be performed with equal ease and suitability for the steps of fitting groups of first, second or next door panels sections 100; 200; 300; 400; 500. The different groups of door panel section may in one embodiment comprise a same number of door panel sections. Alternatively, the groups of door panel sections may in other embodiments comprise different number of door panel sections.

Figure 3A:
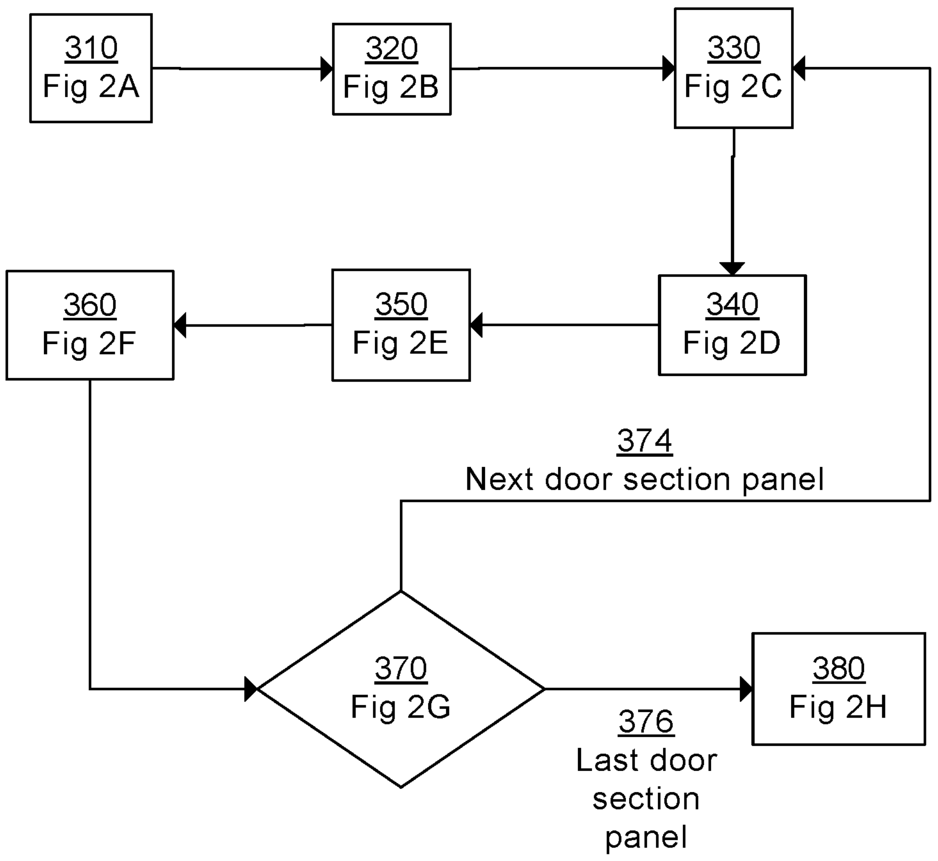
FIG. 3A-3B present flowchart diagrams of the method steps and functionalities of arranging an overhead sectional door with a plurality of door panel sections.
Figure 3B:
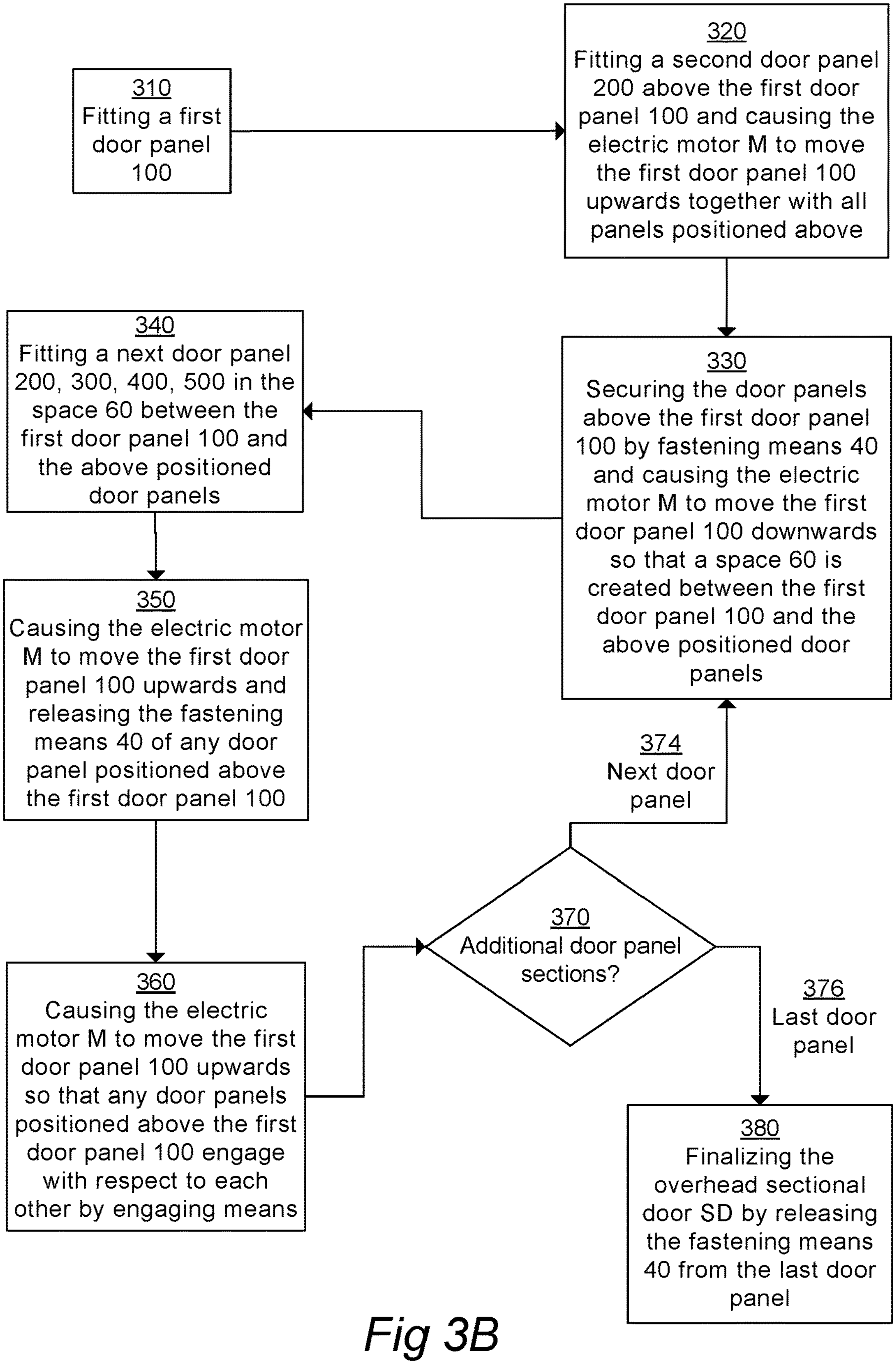

FIG. 3A is a flowchart diagram of the method steps and functionalities of arranging an overhead sectional door SD with a plurality of door panel sections 100; 200; 300; 400; 500, with references to FIGS. 2A-2H. As shown in FIG. 3A, the steps 310, 320 of fitting the first door panel section or the first group of door panel sections, and the second door panel section or the second group of door panel sections, as explained in FIGS. 2A and 2B, are performed once per arrangement. Subsequently, depending on how many next door section panels are required to finish the arrangement of the overhead sectional door, the method steps 330; 340; 350; 360; 370 will be performed for each next door panel section or each next group of door panel sections 374. Finally, upon arranging the last door section panel 376, the method step 380 will be performed, thus finalizing the arrangement. FIG. 3B comprises the same method steps as in FIG. 3A, but in this drawing, a brief explanation is given of what each of the method steps 310; 320; 330; 340; 350; 360; 370; 380 may accomplish during the arranging of the door. The method steps of FIG. 3B present an embodiment where one door panel section is arranged at a time. The method steps may however be equally suitable for arranging groups of first, second and next door panel sections, wherein each group comprises two or more door panel sections.

The invention has been described above in detail with reference to embodiments thereof. However, as is readily understood by those skilled in the art, other embodiments are equally possible within the scope of the present invention, as defined by the appended claims.

The invention claimed is:

1. A method of arranging an overhead sectional door (SD) in a doorframe (10; 20) that defines a door opening in a motorized entrance system (SYS), the overhead sectional door (SD) comprising a plurality of door panel sections (100; 200; 300; 400; 500), the method involving:

a) fitting a first door panel section (100) or a first group of door panel sections among the plurality of door panel sections in the doorframe (10; 20);

b) fitting a second door panel section (200) or a second group of door panel sections among the plurality of door panel sections in the doorframe (10; 20) above the first door panel section (100) or the first group of door panel sections, such that a bottom edge (204) of the second door panel section (200) or a bottommost door panel section of the second group of door panel sections is supported by a top edge (102) of the first door panel section (100) or a topmost door panel section of the first group of door panel sections;

c) actuating at least one electric motor (M) to cause the first door panel section (100) or the first group of door panel sections to move a distance in an upward direction away from ground level (50), the first door panel section (100) or the first group of door panel sections thereby pushing the second door panel section (200) or the second group of door panel sections ahead of it;

d) securing the second door panel section (200) or the bottommost door panel section of the second group of door panel sections with respect to the doorframe (10; 20) by fastening means (40);

e) actuating said at least one electric motor (M) to cause the first door panel section (100) or the first group of door panel sections to move a distance in a downward direction towards ground level (50) and away from the secured door panel section (200; 300; 400; 500), thereby leaving a space (60) between the bottom edge (204) of the secured door panel section and the top edge (102) of the first door panel section (100) or the topmost door panel section of the first group of door panel sections;

f) fitting a next door panel section (300; 400; 500) or a next group of door panel sections among the plurality of door panel sections in the space (60) between the bottom edge of the secured door panel section (200; 300; 400; 500) and the top edge (102) of the first door panel section (100) or the topmost door panel section of the first group of door panel section, such that a bottom edge of the next door panel section (300; 400; 500) or a bottommost door panel section of the next group of door panel sections is supported by the top edge (102) of the first door panel section (100) or the topmost door panel section of the first group of door panel sections;

g) actuating said at least one electric motor (M) to cause the first door panel section (100) or the first group of door panel sections to move a distance in an upward direction away from ground level (50), the first door panel section (100) or the first group of door panel sections thereby pushing the next door panel section (300; 400; 500) or the next group of door panel sections ahead of it;

h) when a top edge of the next door panel section (300; 400; 500) or a topmost door panel section of the next group of door panel sections reaches the bottom edge of the secured door panel section (200; 300; 400; 500):

unsecuring the secured door panel section (200; 300; 400; 500) with respect to the doorframe (10; 20) by releasing the fastening means (40);

actuating said at least one electric motor (M) to cause the first door panel section (100) or the first group of door panel sections to move a further distance in an upward direction, the first door panel section (100) or the first group of door panel sections still pushing the next door panel section (300; 400; 500) or the next group of door panel sections ahead of it;

engaging the top edge of the next door panel section (300; 400; 500) or the topmost door panel section of the next group of door panel sections with the bottom edge of the previously secured door panel section (200; 300; 400; 500);

securing the next door panel section (300; 400; 500) or the bottommost door panel section of the next group of door panel sections with respect to the doorframe (10; 20) by fastening means (40); and repeating steps e) to h) for each next door panel section (300; 400; 500) or next group of door panel sections until at least all but a last door panel section or a last group of door panel sections of the overhead sectional door (SD) have been arranged.

2. The method of arranging an overhead sectional door (SD) as defined in claim 1, wherein the last door panel section or a last group of door panel sections is arranged by:

repeating the steps e) to h); and unsecuring the last door panel section with respect to the doorframe by releasing the fastening means (40).

3. The method of arranging an overhead sectional door (SD) as defined in claim 1, performed during:

an installation procedure of the overhead sectional door (SD); or a service or maintenance procedure of the overhead sectional door (SD).

4. The method of arranging an overhead sectional door (SD) as defined in claim 1, wherein securing a one of the plurality of door panel sections (200; 300; 400; 500) with respect to the doorframe (10; 20) by fastening means (40) comprises:

manually inserting a durable element being resistive enough to withstand a high pressure and weight corresponding to the pressure and weight of an arbitrary number of door panel sections suitable in the overhead sectional door (SD) without the durable element bulging or being damaged.

5. The method of arranging an overhead sectional door as defined in claim 1, wherein engaging the top edge of the next door panel section (300; 400; 500) or the topmost door panel section of the next group of door panel sections to the bottom edge of the previously secured door panel section in said step h) involves use of engagement means (410) which comprises a first hinge plate (452) being pivotally connected to a second hinge plate (462), wherein the first hinge plate (452) is mounted to a surface (470) of the previously secured door panel section, and wherein the second hinge plate (462) is mounted to a surface (480) of the next door panel section (300; 400; 500) or the topmost door panel section of the next group of door panel sections.

6. The method of arranging an overhead sectional door as defined in claim 1, wherein engaging the top edge of the next door panel section (300; 400; 500) or the topmost door panel section of the next group of door panel sections to the bottom edge of the previously secured door panel section in said step h) involves use of engagement means (420; 430; 440) which comprises laterally extending flange elements (450; 460) and receiving slots (455; 465) for flange elements at respective interconnecting sides of said next door panel section (300; 400; 500) or said topmost door panel section of the next group of door panel sections and said previously secured door panel section, wherein said flange elements (450; 460) and said receiving slots (455; 465) for flange elements are at least partly pivotally connectable to each other by the actuation of the electric motor (M) forcing the flange elements (450; 460) to be fitted into the receiving slots (455; 465), thereby securing the two door panels with respect to each other.

7. The method of arranging an overhead sectional door (SD) as defined in claim 1, wherein the doorframe (10; 20) comprises vertical frame sections at respective lateral ends of the door opening, each vertical frame section comprising an elongated transmission member (T), and wherein the first door panel section (100) comprises a pair of drive units (DU) at respective lateral ends thereof, each drive unit (DU) comprising multiple configurations of one or more electric motors (M) and couplings (CO) which are engageable with the elongated transmission member (T) to cause self-propulsion of the first door panel section (100) or the first group of door panel sections with respect to the doorframe (10; 20) in an upward or downward direction upon actuation of the electric motors (M).

8. The method of arranging an overhead sectional door (SD) as defined in claim 1, wherein the doorframe (10; 20) comprises vertical frame sections at respective lateral end of the door opening and one or more elongated transmission members (T), and wherein the doorframe (10; 20) comprises a drive unit (DU) comprising one or more electric motors (M) coupled to a rotary output shaft adapted to transmit a movement and torque to a linkage (L) engageable with the elongated transmission member (T) to cause propulsion of said overhead sectional door (SD) with respect to the doorframe (10; 20) in an upward or downward direction upon actuation of the electric motor (M).

* * * * *